(No Model.)  5 Sheets—Sheet 5.
S. D. FIELD.
ELECTRIC RAILWAY.
No. 384,685. Patented June 19, 1888.
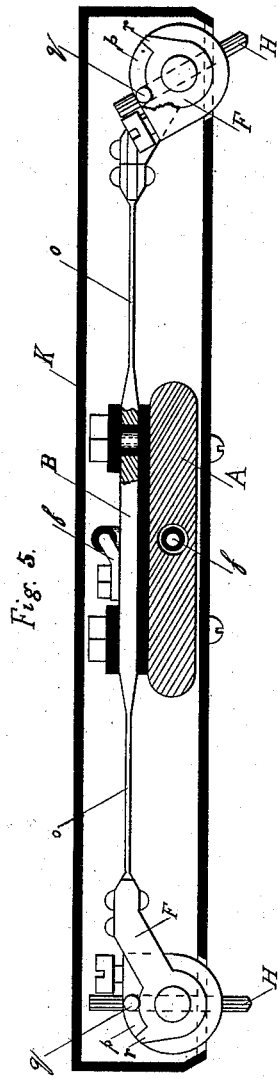
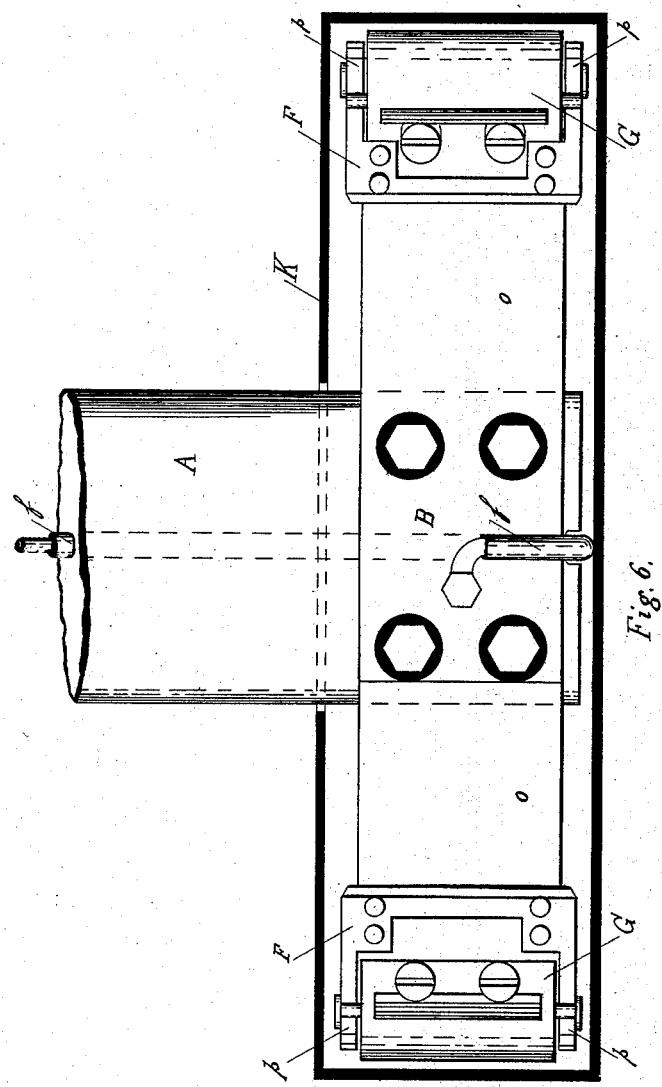
WITNESSES
INVENTOR

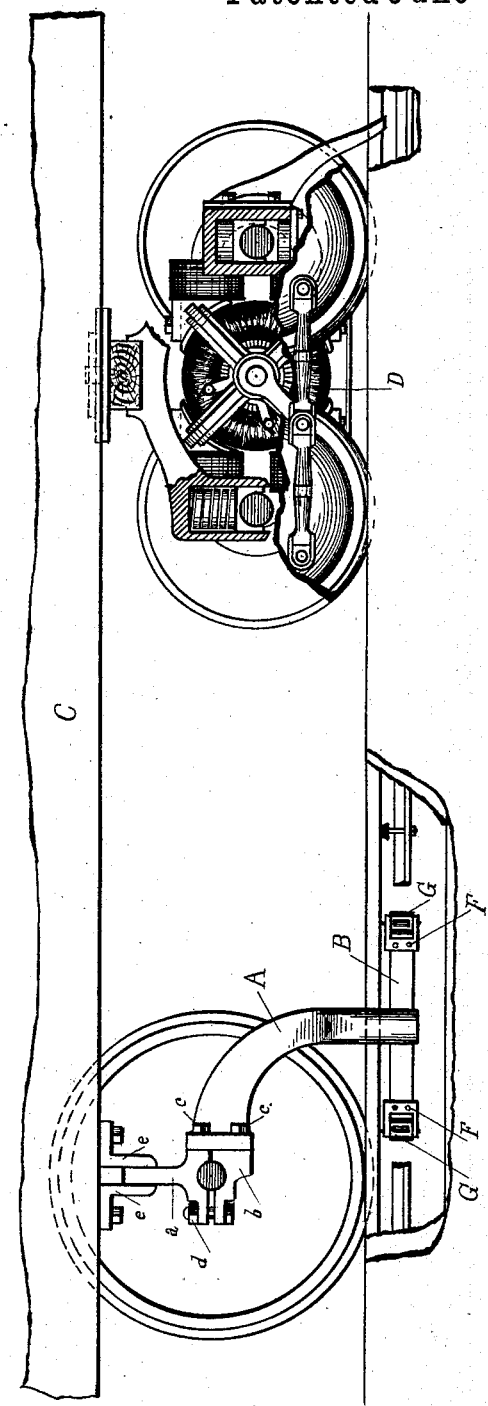

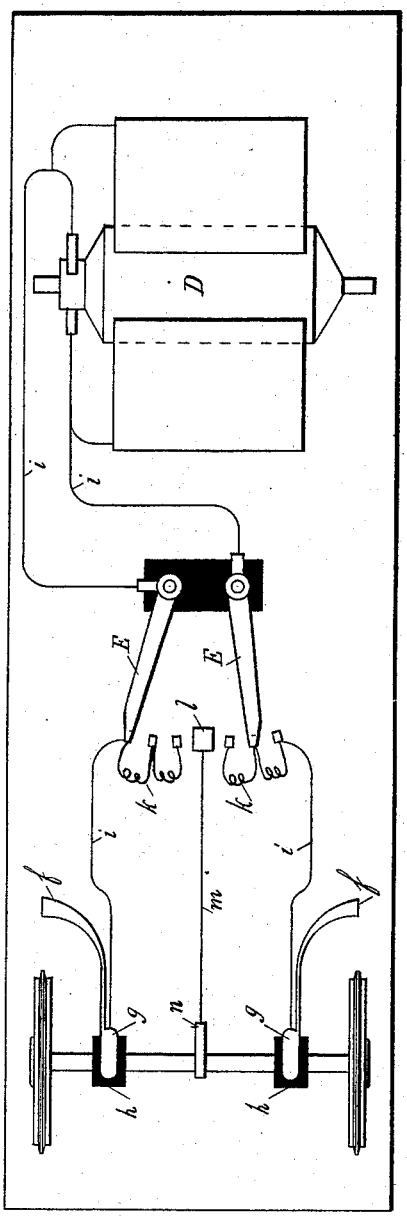

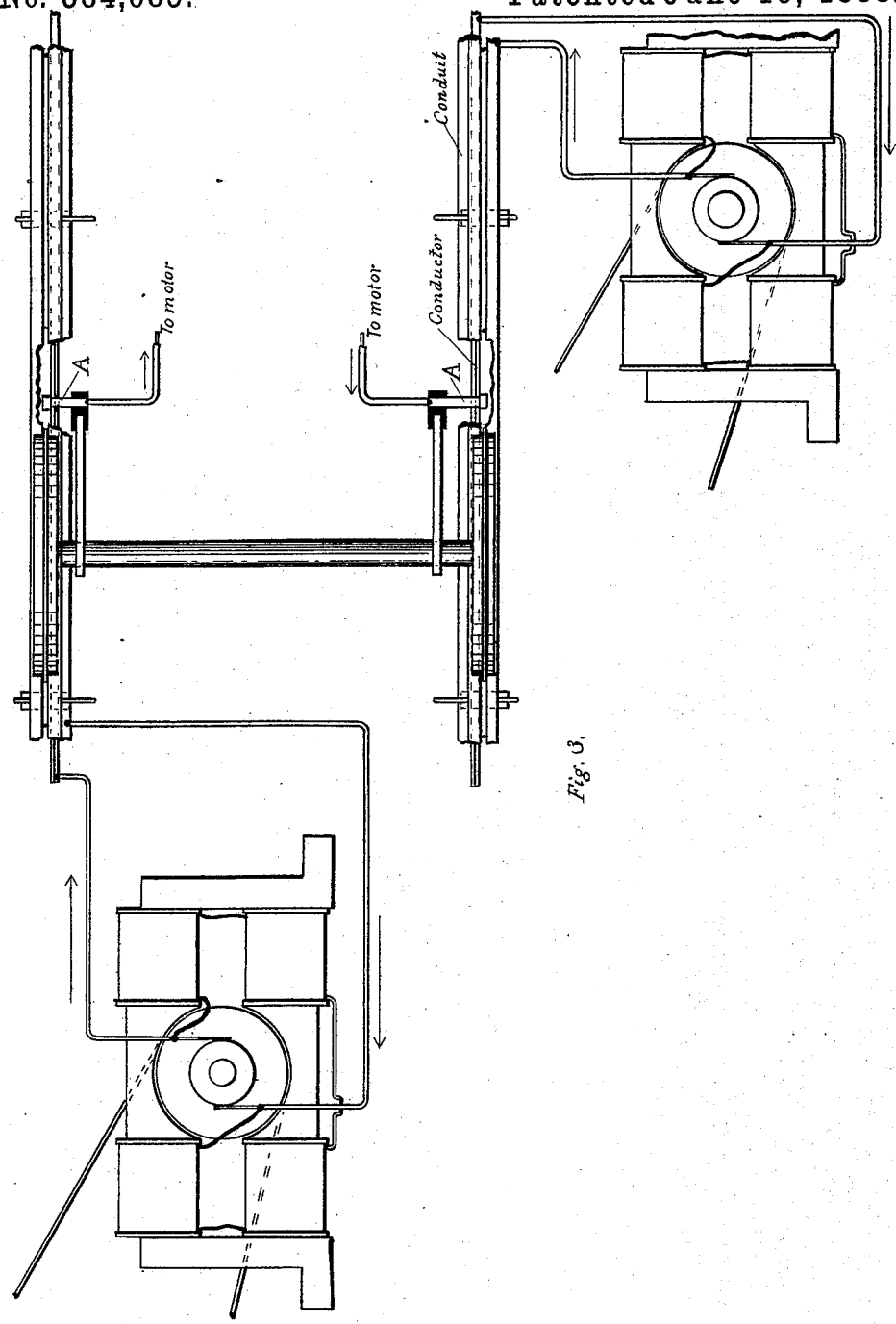

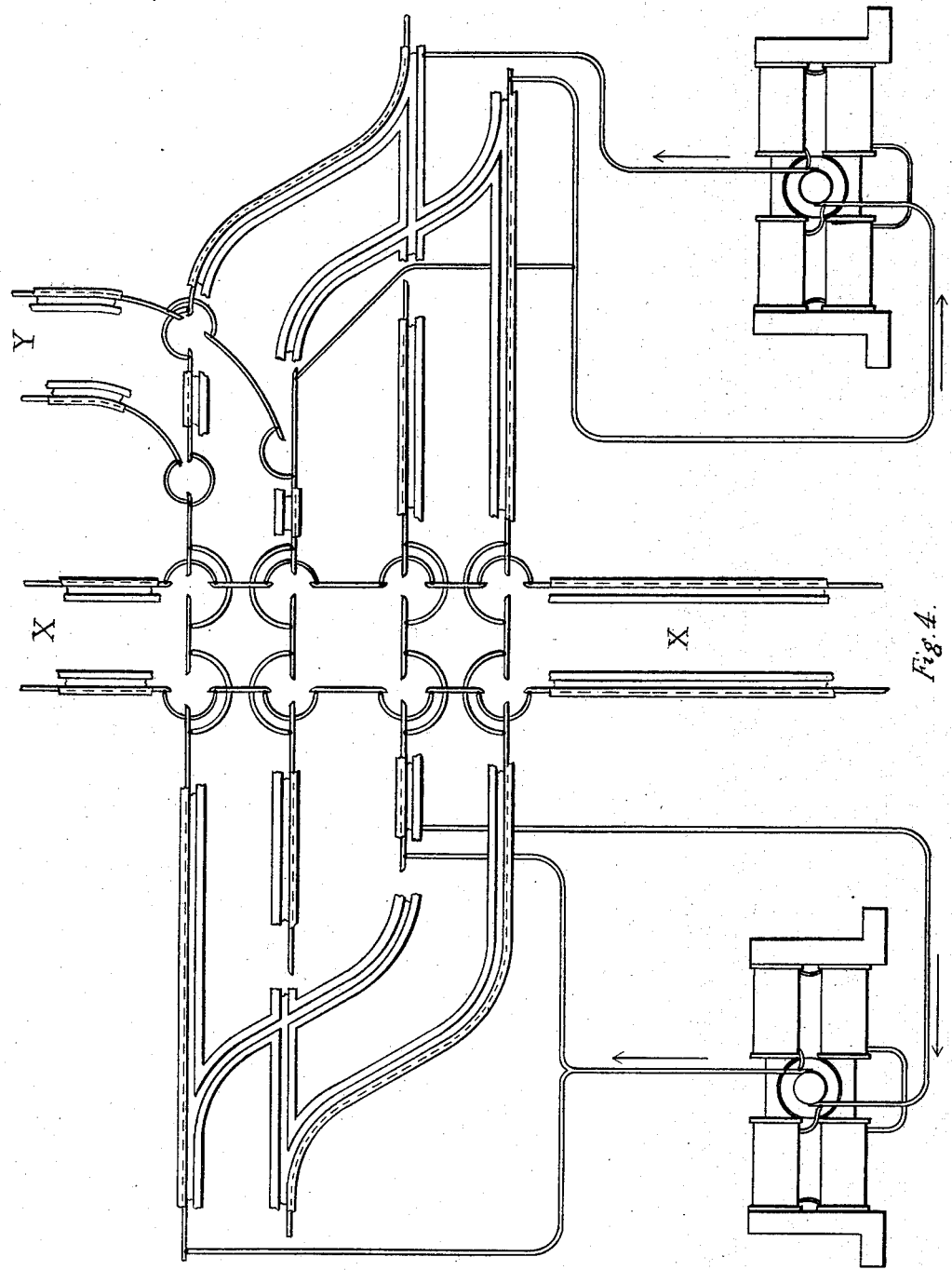

UNITED STATES PATENT OFFICE.

STEPHEN DUDLEY FIELD, OF YONKERS, NEW YORK.

ELECTRIC RAILWAY.

SPECIFICATION forming part of Letters Patent No. 384,685, dated June 19, 1888.

Application filed March 17, 1887. Serial No. 231,255. (No model.)

*To all whom it may concern:*

Be it known that I, STEPHEN DUDLEY FIELD, a citizen of the United States, residing at Yonkers, in the county of Westchester and State of New York, have invented certain new and useful Improvements in Electric Railways and Devices relating thereto, of which the following is such a full, clear, and exact description as will enable any one skilled in the art to which it appertains to make and use the same, reference being had to the accompanying drawings, forming part of this specification.

My invention consists, primarily, in having a source of electric energy, preferably at each end of my railway, each source in communication with a conductor and provided with a return, the circuit being completed between the two conductors through the motor on the car, and the said sources of electric energy being connected in series in the circuit—that is, having their opposite poles to line—whereby the potential of the system remains always the same, no matter what the distance of the motor from either source of energy, so that where the motor moves away from one source of energy and increases the resistance of the conductor between it and said source of energy, it is at the same time moving toward the other source of energy and decreasing the resistance in the conductor lying between it and said latter source of energy in exactly the same proportion. In systems heretofore used there has been but one source of power, and as the motor moved away from said source the resistance increased, and when near the end of the conductor the current would be very much diminished by reason of the increase of resistance, and where the motor approached the source of power the resistance would become less, and more energy would be given to the motor as it approached the source of electricity. By my invention I overcome these difficulties entirely and maintain the potential constant, thus giving to the motors the same electric energy, whatever be their distance from one or other source of energy. In other words, I merely divide my energy, placing half at each end of the line, instead of concentrating it at one point, with the objections noted above.

My invention also consists in a novel form of contact-brush for completing the circuit between said conductors, and a new and useful plow-arm for supporting the same, and, further, in a novel manner of attaching said plow-arm to the vehicle propelled by my motor; and it consists, also, in a novel arrangement of circuits and appliances for operating an electrical railway, with turn-outs, cross-roads, and switching arrangements, and in other features to be hereinafter described, and which will be pointed out in the claims making a part hereof.

In the accompanying drawings, forming part of this specification, Figure 1 represents a side elevation of my motor applied to a car, and the appliances above noted for completing the circuit to devices located on the car for controlling the motor, showing also a portion of the conduit in which the conductor is located; Fig. 2, a plan view of the devices located on the car for controlling the motor, showing the circuits; Fig. 3, a diagrammatic view showing the dynamos at each end of the line and the wheels and axle of the car, with the means for completing the circuit from one line to the other; Fig. 4, a diagrammatic view of the circuit for two parallel railway-lines, a cross-line, and a turn-out; Fig. 5, a plan view of my improved brush for making contact with the conductors, and Fig. 6 a rear elevation of the same with the back portion of the box or casing of the brush removed.

In the several figures of the drawings the same letters indicate the same parts throughout.

My improvements may be attached to an ordinary car. I have designed the same so that an ordinary tram-car can be transformed with but slight expense into an electrically-operated car. I do this by first removing the front set of wheels and axle and replacing the same with a truck swiveled as the ordinary railway-car truck and carrying my motor, as shown in Fig. 1, which has direct connection with the wheels of the truck, which form the drivers. To the rear axle of the car I attach the plow-arm A, carrying the contacting device B at its lower end, in the following manner: I first place two metal pieces, *a b*, which are grooved to receive the axle, upon said axle. The curved plow-arm A is then bolted to said pieces by screws *c c*, and the parts *a* and *b* are then held together at the other end about the axle by a screw-bolt, *d*. The axle rotates freely, as before, the parts *a* and *b* not interfering with such rotation. The piece *a* is extended to work between two guide-pieces, *e e*, bolted to the lower part, C, of the car. The part *a* holds the plow-arm in its position, preventing the same from swinging about the axle, and the guide-pieces *e e*, while holding the part *a*, do not interfere with the action of the springs of the car, which cause the part *a* only to play up and down in the space between the guide-pieces.

In Fig. 2 is shown the arrangement of circuits on the car for controlling the motor. I employ two conductors, one located under each rail, and complete the circuit between the two by means of two plow-arms A upon each side of the car, the wire for completing said circuit being attached to the plow-arm A in any manner desired, and passing up through the bottom of the car.

In another pending application, filed of even date herewith, Serial No. 231,254, I have described and claimed my particular form of conduit, conductor, and rail, and the disposition and arrangement of said conduits and conductors, and will only refer to these features herein in a general way.

By reference to Figs. 3 and 4 it will be seen that I employ my conduits as a return-conductor, with which the wheels of the car are in direct metallic connection.

In Fig. 2, *f f* represent the conductors that emerge from the plows A A on each side of the car, and pass to metallic connections *g g* on the car, which are suitably insulated by material, *h*, from the body of the car, being in no wise dependent upon the action of the axle, as might be judged by an inspection of Fig. 2, the said insulation being located upon the car and not upon the axle. From the metallic connections *g g* the current passes *via* a circuit, *i*, through any desired quantity of resistance, *k*, to the motor D by way of a switch, E. The switch may be operated so as to cut out all the resistance *k*, or to put in any quantity desired. Should, however, the brush upon one side become disabled, or the circuit upon either side not remain intact, or the generator connected to either side break down, the switch E may be turned so as to have one of its arms make contact with a metal piece, *l*, which is connected by a circuit, *m*, to a conducting-piece, *n*, which is in electrical connection in any way desired with the wheels. This would complete the circuit of the motor by way of the conduit to the other generator. The car would therefore be able to proceed by working from the conduit with either one of the generators. Such a connection could be effected at any time, and might be used where the car was going downgrade and did not require the full amount of current. Such a connection in any other event could only have the effect of slowing the speed to some extent.

In Fig. 3 I have shown two dynamos at each end of the line for supplying the current to the two parallel conductors, the said dynamos having their opposite terminals respectively connected with the conductors and the conduits or rails, and connected electrically together by means of the plow-arms A A (shown in diagrammatic view only in this figure) through the motor, the current passing in the direction indicated by the arrows.

In Fig. 4 I have shown about the same disposition of circuits, but on a rather more extensive scale, showing two tracks parallel with each other, with a switching arrangement at each end of the line for changing from one track to another. In this figure the dynamo at the left hand is connected by, say, its positive terminal with one of the parallel conductors of each track, and the dynamo at the right hand is connected by its opposite or negative terminal to the remaining parallel conductor of each track. The other terminal of each dynamo is connected to the conduits, which are all in metallic connection. These latter terminals may be connected to any other conductor which will serve as a return. At each end of the track, where switching is to be done and speed is not required, one of the parallel conductors may stop short of the end. In such a case the operator upon the car will move the switch that completes the circuit to said conductor, so that said switch will be placed in electric communication with the wheels of the car-rails and conduit, which serve as the return. The switch on the car controlling the circuit to the other parallel conductor is left undisturbed, and so completes the circuit from said conductor to its return. The latter conductor, being connected to but one generator, therefore puts but one dynamo in circuit. This utilizing but one source of energy may be put into effect very advantageously when going downhill, when so much power is not required.

At X X is shown an independent cross-road which has an independent circuit. The circuit is from the positive pole of one generator to one of the parallel conductors of each track, through the plow-arms and motors upon the various cars that are on said track, down the plow-arms, which make contact with the other parallel conductor of each track, back to the negative terminal of the generator at the other end of the line, through said generator to the return-circuit, (which may be the conduit-walls,) and to the first-mentioned generator, the negative pole of which is connected to said return. When there is more than one car on the tracks, the motors on said cars, of course, will be in multiple arc. Where the one road crosses the other, it becomes necessary to leave a space in one conduit for the other conduit to pass through. This interrupts the arrangement of circuits to some extent, and it becomes necessary to connect the conductor by means of loops around the interrupted portions, so as to complete the continuity of the same. With an ordinary brush making contact with said conductor the circuit to the motor would be broken when the brush reached said interrupted portion. By means of my improved brush or contact device, (shown in Figs. 1, 5, and 6,) I eliminate this difficulty, said device being provided with two brushes, one at each end, and having quite a distance between them, so that while the brush at one end may be at the interrupted portion the brush at the other end will be in contact with the conductor. The details of this brush will be described hereinafter.

At Y, I have shown a turn-out supplied from the dynamos shown in the figure. The functions performed by my brush-contact maker permit the car to pass upon this branch, as set out above.

My improved brush contact maker consists of a metal plate, B, bolted to and insulated from the plow-arm A, and cut away at *o o*, making two spring-arms, to which are bolted carriers F F, which swivel brush-holding devices G G, the brushes being indicated by the letters H H. The carrier F is cut away at *p*, forming a stop, *r*, which limits, together with a shoulder on the carrier, the play of the brushes H H by means of pins *q q*. This gives the brushes a certain lead—that is to say, an inclination away from the direction they are traveling. The portions *o o* give the contacting device an elastic and springing action. The conductor *f* makes contact with the device B, and is bent so as to pass up through the plow-arm A, and from thence to the car, as shown in Fig. 2. The brush-contacting device is surrounded by an insulating-box, K, through which the plow passes and from which the brushes protrude. It is bolted or affixed to the plow-arm A by screws, or in any manner desired.

Having now fully set forth my invention, I desire to have it understood that I do not limit myself to the construction and exact arrangement described, but reserve to myself all changes and adaptations that come within the scope of my invention. The right is also reserved to make all changes and variations in practice that fall within the scope of what I now desire to claim and secure by Letters Patent of the United States, which is—

1. An electrical railway having a source of energy at each end of the line connected by their opposite terminals with two conductors, returns for said sources of energy, and connections for completing the circuit through a locomotor between said conductors, for the purpose specified, whereby the potential of the system is maintained constant.

2. In an electrical railway, two parallel conductors for supplying current to a locomotor, a source of electricity at each end of the line, connected each to one of said conductors, and a return for the remaining terminals of said sources of electricity, whereby the potential remains the same, whatever be the location of the locomotor.

3. The combination, in an electrical railway, of two sources of electrical energy, conductors connected to two opposite terminals of said sources of electrical energy and suitably insulated, a locomotor, electrical connections for completing the circuit between said conductors through said locomotor, a return for the remaining terminals of said sources of electrical energy, a terminal for said return located upon the locomotor, and a switch, also upon the locomotor, for connecting the terminals of said locomotor with one or the other or both sources of electric energy at will.

4. In an electric railway, two sources of electric energy connected to conductors by their opposite poles, respectively, a conduit, within which said conductors are suitably insulated, a motor located upon a car traveling upon the exposed portion of said conduit, circuit-completing connections carried by said car, a lead from the other terminals of said sources of electrical power connected to said conduits, and switches for completing the circuit at either side of the motor through the wheels to the conduit or return-circuit, so that either source of power can be used exclusive of the other whenever desired.

5. An electrical railway having two sources of electrical energy, conductors arranged along the way permanently connected to each respective source, returns for said sources of electricity, and electrical connections on the locomotor adapted to complete the circuit between said conductors through the motor on the car, or to put either terminal of the motor in communication with its respective return, whereby either source of energy or both may be drawn on at will.

6. The combination of a car, as C, carrying an electric motor, two conduits, upon the exposed portions of which said car is adapted to travel, two insulated conductors in said conduits, a generator in electrical communication with each of said conductors connected by opposite poles, the remaining poles being connected to the conduit, and electrical connections completing the circuit between said conductors through the motor.

7. The combination, in a railway, of a plow-arm, as A, for transmitting the electric power to the car, two pieces, as *a b*, grooved to accommodate the axle and bolted to said plow-arm, a device for holding the same to the axle, and an extension of the part *a* and guide-pieces *e e*, within which said extension works, whereby the action of the springs of the car is not interfered with and the plow-arm is held in the required position.

8. The combination, as a contacting device movable along an electric circuit, of a metal piece, as B, bolted to a supporting-piece, A, two carriers, F F, attached at each end thereof, and a swiveled carriage, G, mounted in each carrier and carrying the brushes H H.

9. The combination, as a brush-contact device for an electric circuit, of a supporting-arm, as A, a metal plate, as B, bolted thereto but insulated therefrom, a conductor, as $f$, in electrical connection with B and passing through A, from which it is insulated, a carrier, F, at each end of said plate B, a swiveled brush-carrying device, G, borne by each carrier, and means for regulating the play of said brush and carrier, so as to give the brush a lead when traveling in either direction.

10. The combination of a circuit-completing device, as B, adapted to travel in a conduit and having a brush at each end thereof, said brushes being separated by the space described, and an insulating box or housing, K, for said device, having slots therein, through which the brushes protrude, whereby the device is prevented from establishing an electrical connection, except through the brushes.

In testimony whereof I have hereunto set my hand and seal, this 15th day of March, 1887, in the presence of the subscribing witnesses.

STEPHEN DUDLEY FIELD. [L. S.]

Witnesses:
A. C. FOWLER,
CHAS. D. FOWLER.